Jan. 21, 1941.   W. J. VICKERY   2,229,400
TYPEWRITING AND LIKE MACHINES
Filed March 10, 1937   3 Sheets-Sheet 1
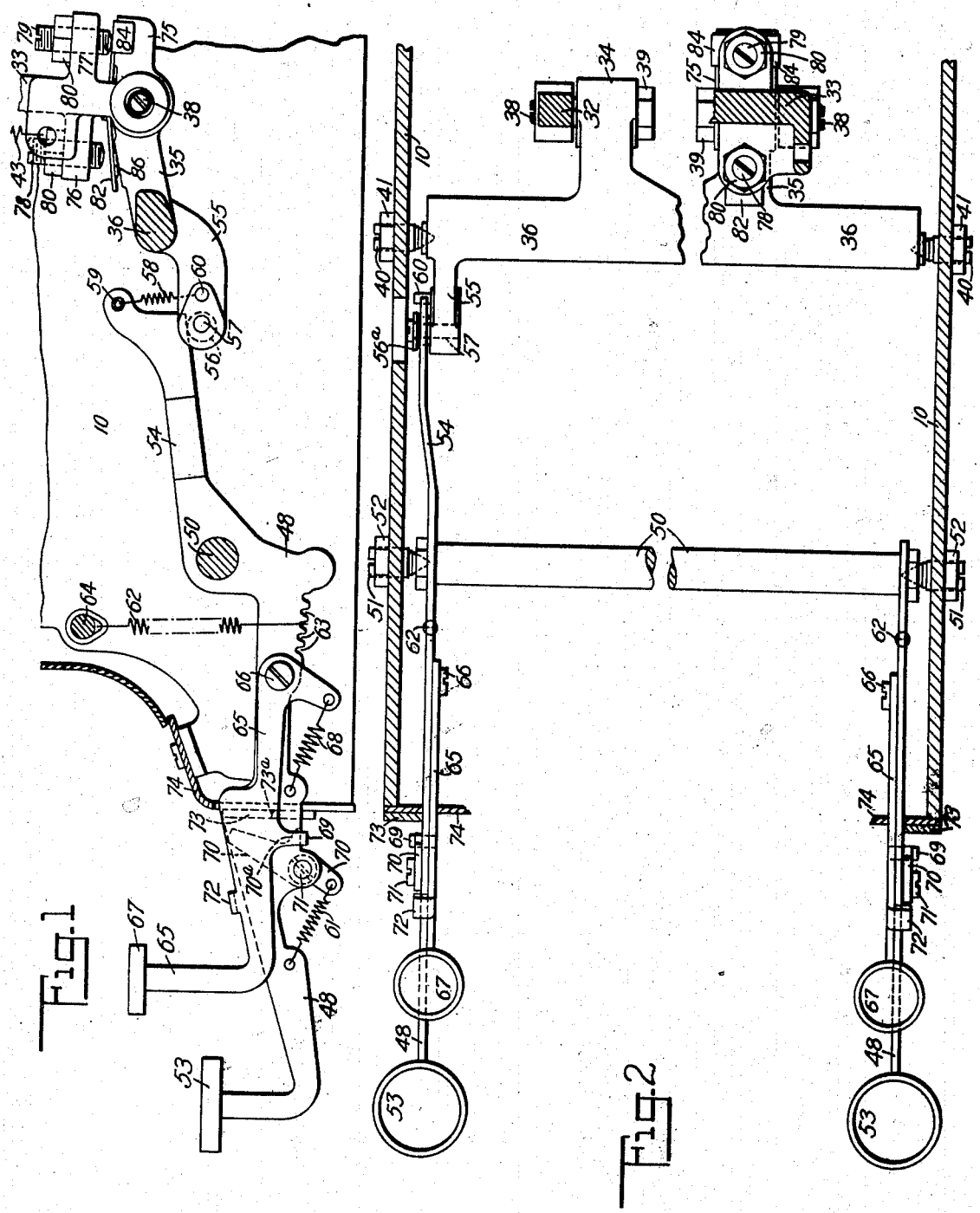
Inventor
WILLIAM J. VICKERY
By Charles E. Smith
Attorney

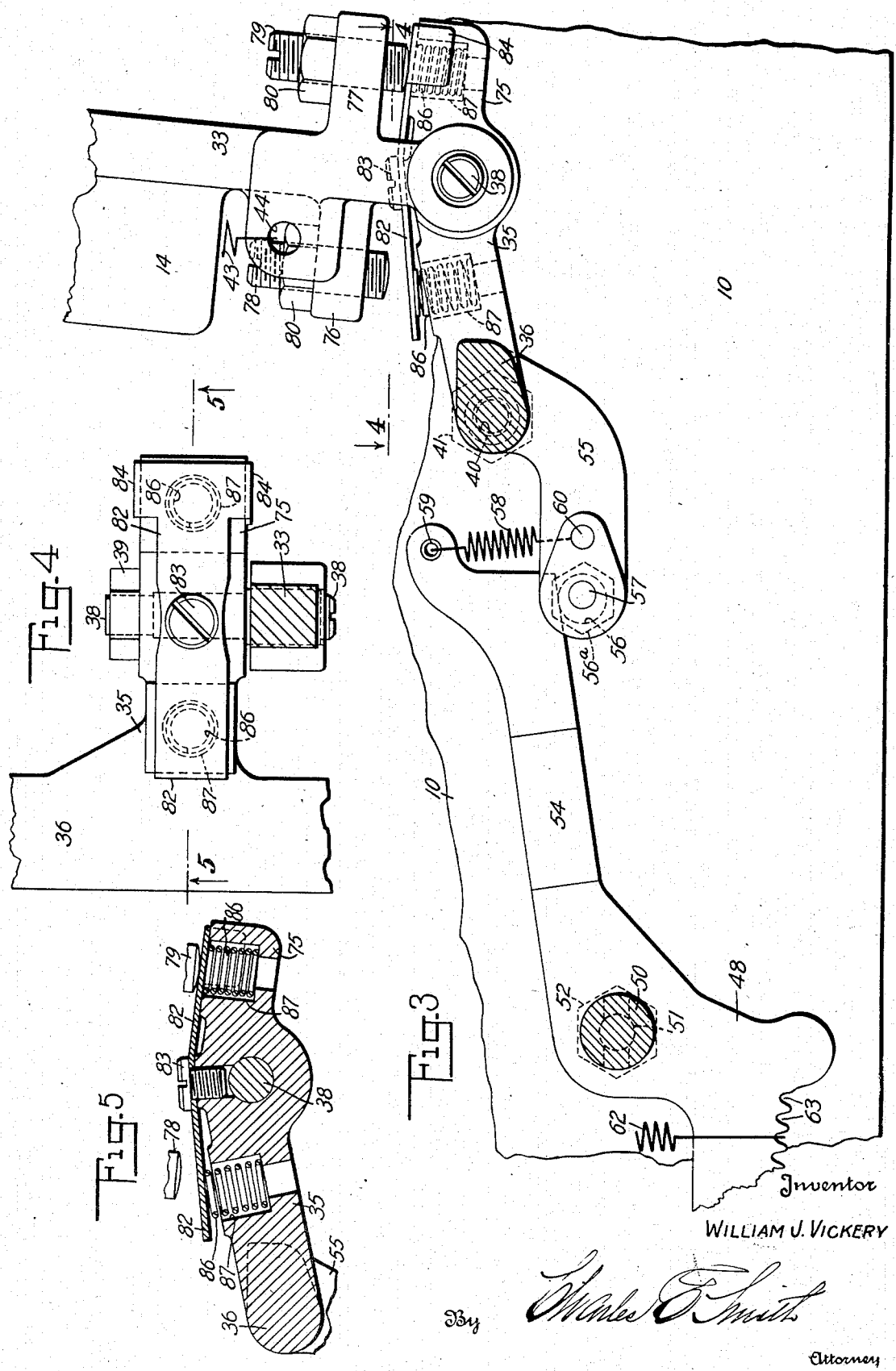

Jan. 21, 1941. W. J. VICKERY 2,229,400
TYPEWRITING AND LIKE MACHINES
Filed March 10, 1937 3 Sheets-Sheet 3
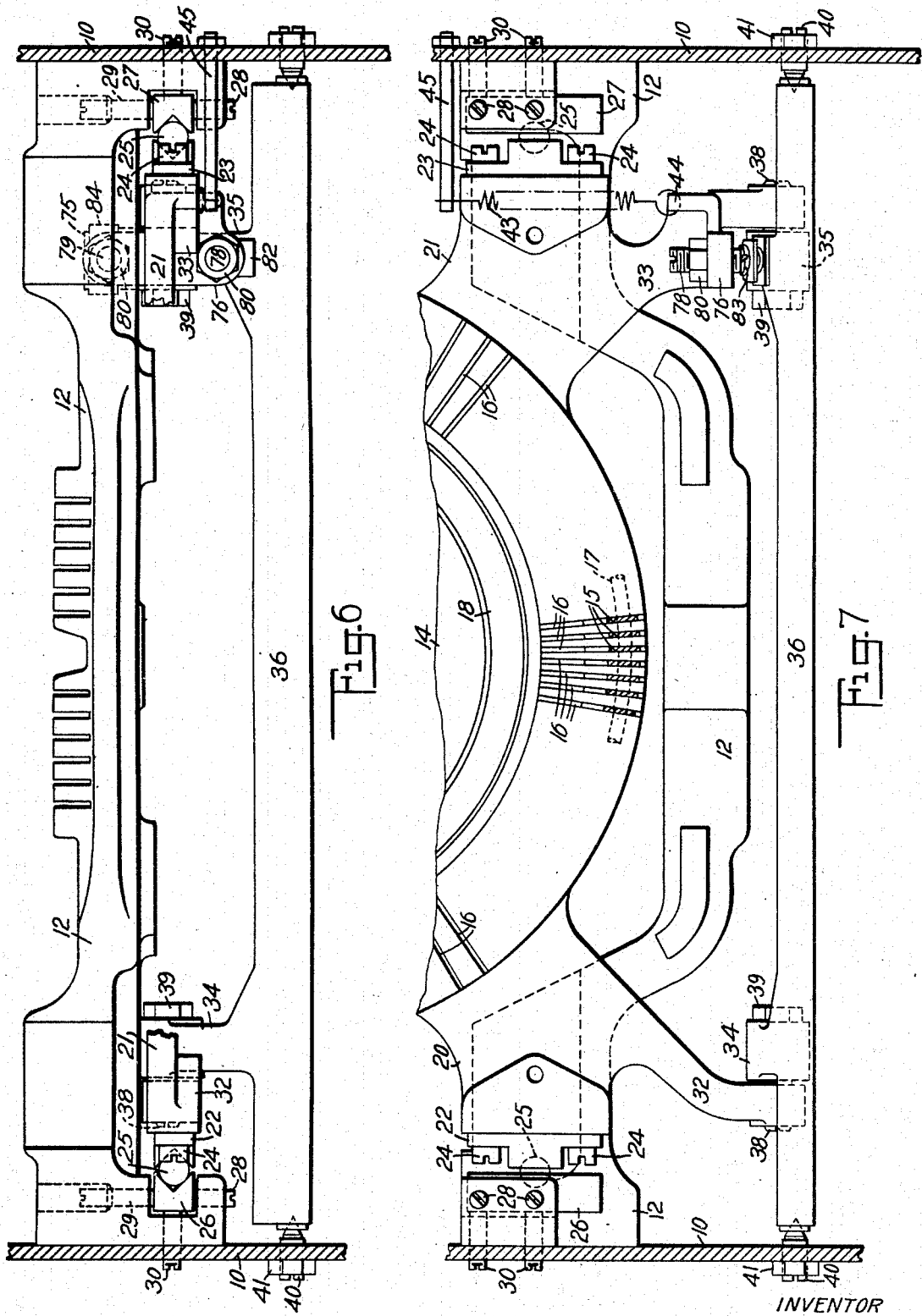
INVENTOR
WILLIAM J. VICKERY
By Charles B. Smith
Attorney Patented Jan. 21, 1941

2,229,400

UNITED STATES PATENT OFFICE 2,229,400

TYPEWRITING AND LIKE MACHINES

William J. Vickery, Elmira, N. Y., assignor to Remington Rand Inc., Buffalo, N. Y., a corporation of Delaware Application March 10, 1937, Serial No. 130,127

9 Claims. (Cl. 197—74)

My invention relates to typewriting and like machines, and more particularly to improved case shift mechanism and shift motion stops therefor.

The main object of my invention, generally stated, is to provide improved means of the character specified which is simple, reliable and highly effective in operation.

Another object of my invention is to provide improved shift motion stops wherein the noise incident to case shifting is minimized or materially reduced, and yet wherein the motion of the case shifting member is positively limited to insure definite and uniform case shifting positions thereof.

Still another object of my invention is to provide such improved shift motion stops in a case shifting mechanism wherein the force of the case shifting member arrested by such stops is substantially constant regardless of the force exerted by the operator on the case shift key, whereby the silencing or noise absorbing properties of such stops may be arranged in accordance with a uniform impact or force incident to stopping the case shifting member.

To the above and other ends which will hereinafter appear, my invention consists in the features of construction, arrangements of parts and combinations of devices set forth in the following description and particularly pointed out in the appended claims.

In the accompanying drawings, wherein like reference characters indicate corresponding parts in the different views:

Fig. 1 is a vertical fore and aft sectional view of a sufficient number of parts of a typewriting machine to illustrate my invention in its embodiment therein.

Fig. 2 is a top plan view, with parts in section, of so much of the machine as is shown in Fig. 1.

Fig. 3 is an enlarged side elevation with parts in section of certain of the parts of the construction shown in Fig. 1.

Fig. 4 is an enlarged, detail sectional view taken on line 4—4 of Fig. 3 and viewed in the direction of the arrows at said line.

Fig. 5 is a detail, enlarged, fore and aft sectional view taken on line 5—5 of Fig. 4 and viewed in the direction of the arrows at said line.

Fig. 6 is a detail, fragmentary top plan view with parts broken away and in section of a portion of the case shifting mechanism.

Fig. 7 is a front elevational view of the same with parts in section.

In the accompanying drawings, I have shown the devices of my invention applied to a typewriting machine having a type basket which is movable for case shifting, but it is to be understood that such devices may equally well be employed in a machine of the type having a platen or platen carrying carriage which is movable for case shifting. In other words, my invention may be applied to different types of machines, and when I refer herein to a "case shifting part or member," I intend such term to have a generic meaning applicable to either a type basket, to a platen or to any member which is arranged for case shifting movement.

In the drawings, parts of the case shift mechanism are mounted within a frame comprising side plates 10 which are inter-connected by cross members, one of which is a cross member 12, shown in Fig. 6 and Fig. 7. The cross member 12 is fixedly secured to each of the side plates 10 and is utilized to guide the upper end of a type basket which includes a type bar segment 14 (see Fig. 7) mounted for vertical case shifting movement. The segment 14 is of the usual construction carrying type bars 15 mounted in companion slots 16 in the segment and on a common fulcrum wire 17. The type bars 15 are to be actuated in the usual manner by suitable type actions (not shown) to move them to printing position where the bars contact an anvil 18. In the present construction, the segment 14 when in its normal elevated position shown in the drawings is adapted to write the lower case characters, and when shifted downward to its lower position, is adapted to write the upper case characters, although from certain aspects of the invention, this direction of case shift movement from the normal position may be reversed if desired.

The segment 14 is provided with left and right-hand lateral extensions 20 and 21 respectively. In the present instance suitable ball race members 22 and 23 are fixedly secured by screws 24 to the vertical end surfaces of the extensions 20 and 21 respectively, which members 22 and 23 are grooved to provide raceways for anti-friction bearing balls 25. The balls 25 also are received in raceways formed in stationary race members 26 and 27 arranged opposite the race members 22 and 23 respectively. The stationary race members 26 and 27 are adjustably mounted in channels in the cross member 12 by front and rear locating and holding screws 28 and 29 respectively and by similar side screws 30. In this manner, each of the stationary race members 26 and 27 may be adjusted forwardly or rearwardly relative to the cross member 12 and also to or from the companion race members 22 and 23, whereby an accurate line of case shifting movement of the segment 14 may be afforded and yet the segment is firmly guided against transverse displacement. In the present instance, the heads of the screws 24 are sufficiently long to prevent the bearing balls 25 from falling or riding out of their companion raceways.

The extensions 20 and 21 of the segment 14 are provided with depending arms 32 and 33 respectively which are pivotally connected to arms 34 and 35 of a segment-shifting rock shaft 36. Referring more particularly to Fig. 4, it will be understood that the pivotal connections between the depending arms 32 and 33 and the rock shaft arms 34 and 35 are formed by shouldered screws 38 retained in the arms 34 and 35 by nuts 39 threaded thereon. The segment-shifting rock shaft 36 is pivotally supported at its ends on coned pivot screws 40 received in tapped openings in the side plates 10 and retained in position by lock nuts 41 threaded thereon.

The segment 14 is thus supported at its upper end between the side plates 10 by the bearing balls 25, and at its lower end by the pivotal connection with the arms 34 and 35 for vertical case shifting movement. It will be apparent that during such case shifting movement, the arcuate travel of the extreme lower end of the segment about the axis of the rock shaft 36 will cause a very slight pivotal movement of the segment about the single bearing ball 25 at each side thereof. In order to partially counteract the weight of the segment 14 and the parts carried thereby, a contractile counter-balance spring 43 is connected at 44 to the depending segment arm 33 and extends upwardly to a supporting rod 45 extending inward from the right-hand side plate 10. The effective force of this spring 43 is insufficient to maintain the segment 14 and the parts carried thereby in elevated position, the spring being employed merely to decrease the force required to operate and hold the segment in such elevated position, as will hereinafter more clearly appear.

The case shifting mechanism includes case shift key levers 48, one located at each side of the machine and fixedly connected to the associated end of a rock shaft 50 in any suitable manner to move in unison therewith. The rock shaft 50 is pivotally mounted at its ends by coned screws 51 threaded in tapped openings in the side plates 10 and retained therein by lock nuts 52. Each case shift key lever 48 is provided at its forward end with a case shift key 53. The operating connection between the case shifting mechanism and the segment or case shiftable part is provided in the present instance by an arm 54, which is a rearward extension of the left-hand key lever 48, and this arm 54 coacts with a forward extending arm 55 on the segment-shifting rock shaft 36, or a part carried thereby. Thus, the lower edge of the rearward end of the arm 54 overlies and contacts with a ring or contact sleeve 56 eccentrically mounted and rotatively adjustable on a screw 57 threaded into the arm 55 as may be seen in Fig. 3. A rotative adjustment of the sleeve 56 may be effected with the aid of a hexagon head 56ª on the member 56, and the desired position of adjustment thereof may be retained by tightening the screw 57. The effect of this adjustment of the member 56 is to raise or lower the peripheral contact surface thereof and thus regulate the height of the shift key in the keyboard. An upward movement of the arm 54 is not positively transmitted to the arm 55, the only connection for such direction of movement between these arms 54 and 55 being a contractile spring 58 connected at 59 to the rearward end of the arm 54 and extending downwardly to a pin 60 carried by the arm 55.

In the present instance the segment 14 is returned to and normally maintained in its elevated position to write lower case characters by springs 62, there being one spring 62 connected in rack notches 63 on each of the case shift key levers 48, and each spring 62 extends upward to and is anchored on a fixed cross rod 64. The springs 62 as viewed in Fig. 1 and Fig. 3 exert a clockwise force on the rock shaft 50 which tends to move the arm 54 downward, and the arm 54, through its engagement with the ring 56 of the arm 55, exerts a counter-clockwise force on the segment-shifting rock shaft 36 which tends to move the arms 34 and 35 and accordingly the segment 14 upward. The effective force of each of the springs 62 is adjusted by shifting the point of connection of the lower end thereof along the rack of the companion case shift lever 48 to provide a combined effective force which is sufficient to reliably shift the segment 14 and the parts carried thereby to the upper normal position.

It will now be clear that a downward pressure on the key 53 of either of the case shift key levers 48 will relieve the effective force of the springs 62 from the segment 14 by moving the arm 54 upward out of the path of movement of the arm 55, thus allowing a clockwise rotation of the rock shaft 36 which allows the segment 14 to drop freely under its own weight. It will thus be clear that if a hard blow is delivered by the operator upon the key 53 of either of the case shift levers 48, the resulting severe upward force of the arm 54 will not be positively transmitted to the arm 55 as the spring 58 will allow a separation of the arm 54 from the ring 56. Accordingly, it will be clear that the segment 14 and the parts carried thereby will move downward from the normal elevated position at substantially the same rate of speed and with substantially the same degree of force irrespective of the amount of force exerted by the operator on the case shift key.

Each of the case shift key levers 48 is provided with case shift locking devices which include a shift lock lever 65 pivotally mounted thereon at 66 and provided with a key 67 at its forward end. A contractile spring 68 connects each lever 65 with the companion lever 48 and tends to maintain the parts in the relation shown in Fig. 1 wherein a laterally projecting lug 69 on the locking lever 65 engages the lower edge of the companion shift lever 48. A locking pawl 70 is pivotally mounted at 71 on each of the case shift key levers 48, and a spring 61 normally retains the pawl 70 in the position shown in Fig. 1 wherein a rearward extension 70ª engages the lateral projecting lug 69 of the companion locking lever 65.

In operating this case shift locking mechanism, the case shift lock key 67 is depressed to initially effect a relative movement between the lever 65 and the lever 48, which relative movement engages a laterally projecting lug 72 on the locking lever 65 with the upper edge of the case shift lever 48. This initial relative movement between the levers 65 and 48 also moves the laterally projecting lug 69 of the lever 65 away from the extension 70ª of the pawl 70 thereby allowing the upper end of said pawl 70, under the force of the spring 61, to move into engagement with a plate 73 which is adjustably mounted, by means not shown, on the front plate 74 of the machine. The continued downward movement of the key 67 moves levers 65 and 48 in unison through the lug 72 until the case shifted position of the lever 48 is reached, whereupon the upper end of the pawl 70 is shifted by the force of the spring 61 beneath a locking shoulder 73ª on the plate 73. When the downward pressure on the case shift lock key 67 is relieved, the upward force of the case shifting springs 62 on the levers 48 effects a locking engagement between the upper ends of the pawl 70 and the locking shoulder 73ª which is sufficient to prevent the action of the lug 69 on the pawl extension 70ª under the force of spring 68 from shifting the pawl 70 out of its locking position. In order to release the case shifting mechanism from this locked position, a downward pressure may be exerted on either of the case shift keys 53 to relieve the locking pressure on the pawl 70 exerted by the springs 62, thereby allowing the force of the spring 68 acting through the engagement of the lug 69 with the extension 70ª to shift the pawl 70 out of the path of the shoulder 63ª. Thus, the case shifting levers 48 may return to their normal position when finger pressure on the case shift key 53 is released and the effective force of the springs 62 will elevate the segment to normal position.

In accordance with this invention, I provide coacting stop devices which in the present instance are located between the segment arm 33 and the arm 35 of the segment-shifting rock shaft 36 for limiting the upward and downward case shifting motion of the segment 14. These stop devices are arranged to limit the relative movement between the arms 33 and 35 and accordingly include similar parts arranged on opposite sides of the pivotal connection 38 between the arms 33 and 35. The rock shaft arm 35 extends rearwardly at 75 beyond the pivotal connection 38, and the segment arm 33 is provided with a lug 76 extending forward over the intermediate portion of the arm 35 and a similar lug 77 extending rearward over the extension 75 of the arm 35.

The lugs 76 and 77 of the segment arm 33 are provided with similar screw stops 78 and 79 respectively threaded in tapped openings therein and retained in their adjusted position by respective lock nuts 80. A flat leaf spring or steel strip 82 is retained at its central portion by a crew 83 threaded in a tapped opening in the arm 35 above the pivot screw 38, and the spring strip 82 extends forward above the center portion of the arm 35 as well as rearward over the arm extension 75. The rearward portion of the strip 82 is provided with side extensions 84 extending downward along the edges of the arm extension 75 to prevent the strip 82 from turning about the screw 83. The front and rear ends of the spring strip 82 are each normally supported and biased upwardly by respective coiled expansion springs 86 which are seated in depressions 87 in the arm 35 and extension 75 as may be seen in Fig. 5. The expansion springs 86 force the associated ends of the strip 82 upward out of engagement with the arm 35 and extension 75 when such ends of the strip are not engaged by the associated stop screws 78 and 79.

In the present construction, it will be clear that during the shifting of the segment 14 from one case position to the other, the rock shaft arm 35 has a pivotal motion relative to the segment arm 33, and this pivotal motion engages the lower end of the stop screw 79 with the rearward portion of the spring strip 82 when the segment moves towards its elevated position, and when the segment moves toward its lower position, this pivotal motion engages the lower end of the other stop screw 78 with the forward portion of the spring strip 82.

The ends of the spring strip 82 and the associated expansion spring 86 are arranged to yield under the segment shifting force. For example, the combined effective force of the two case shifting springs 62 is sufficient to overcome the weight of the segment 14 and parts carried thereby, and in addition, this force is also sufficient to move the rear end of the strip 82 into contact with the screw stop 79 and overcome the spring pressure of the strip and the expansion spring 86 thereby bringing the rear end portion of the strip 82 in contact with the upper surface of the arm extension 75 and thus effecting a positive arrest of the parts. Likewise, when the force of the springs 62 is relieved by the depression of a case shift key, the part of the weight of the segment 14 and parts carried thereby which is not counteracted by the spring 43 turns the rock shaft 36 in a clockwise direction and engages the stop screw 78 with the forward end of the spring strip 82 with sufficient force to compress the associated spring 86 and force the forward end of the spring strip 82 into engagement with the upper surface of the arm 35.

As previously described, the present case shifting construction allows the segment 14 to fall by its own weight to its lowermost upper case position with substantially a constant force regardless of the force exerted by the operator on the case shift key, and obviously the force operating the segment upwardly is likewise constant as it is merely effected by the case shifting springs 62 through a release or removal of finger pressure on the case shift key. Accordingly, it will be clear that during operation of the case shift mechanism, the force bringing about an engagement between the stop screws 78 and 79 and their associated ends of the spring strip 82 will be substantially constant, thereby allowing the compression springs 86 and the ends of the spring strip 82 to provide a tension which always cushions or absorbs the shock of the case shifting operations, and yet which always allows the engagement of the ends of the spring strip 82 with the arms 35 and 75 to insure positive position of arrest of the segment in a substantially noiseless manner.

In this manner, the cushioning effect of the spring 86 and the ends of the spring strip 82 absorbs a major part of the impact force incident to arresting the segment 14 in each of its case positions, and accordingly eliminates the shock and the noise which otherwise would result. Nevertheless the engagement of the ends of the spring strip 82 with the non-yielding arms 35 and 75, is effected and positively limits the case shifting movement of the segment. The normal elevated position of the segment 14 may be adjusted by turning the stop screw 79, and in a similar manner, the lower position thereof may be adjusted by turning the stop screw 78, thereby affording an accurate printing position for both lower and upper case characters.

It will be seen that I have thus provided simple and highly effective mechanism for limiting the motion of a case shifting member wherein the shock, vibration and noise usually accompanying the stopping of such case shift motion is materially reduced by resilient stop devices. In the specific form shown herein, the resilient stop devices are provided to limit the relative pivotal motion between a case shifting member and its actuating means, thus affording a very simple and rugged unitary structure which may be easily and accurately assembled and adjusted. These stop devices, however, have been so arranged that the resiliency thereof is positively limited, thereby insuring definite and uniform positions of arrest of the case shifting member, and also substantially eliminating any tendency of the case shifting member to vibrate or rebound from said positions of arrest.

In the present instance, I have provided such case shift motion stops in a case shifting mechanism wherein the force of the case shifting member resisted by the resilient stop devices is substantially constant regardless of the force exerted by the operator on the case shift keys, whereby the silencing or noise absorbing qualities of the stop devices may be arranged in accordance with a uniform impact force incident to the arrest of the case shifting member.

Various changes may be made in the construction, and certain features thereof may be omitted, without departing from my invention as it is defined in the accompanying claims.

What I claim as new and desire to secure by Letters Patent is:

1. The combination of a case shiftable part mounted for substantially vertical case shifting movement, a crank arm pivotally connected to said shiftable part to move the same, and stop means for arresting said shiftable part in either upper case or lower case position, said stop means comprising resilient members carried by said arm at opposite sides of said pivotal connection thereof with said shiftable part, an adjustable stop member carried by said shiftable part and engageable with one of said resilient members when said shiftable part approaches one case shift position, a second adjustable stop member carried by said shiftable part and engageable with the other of said resilient members when said shiftable part approaches the other case shift position, and means positively limiting the resilient movement of said resilient members.

2. The combination of a case shiftable member, means for shifting said member including a crank arm pivotally connected to said member for controlling the case shifting movement thereof, and stop means carried by said arm at opposite sides of the pivotal connection thereof with said member, said stop means comprising yielding means normally out of contact with said arm and movable by said member into contact with said arm when said member reaches either of its extreme case shifting positions.

3. The combination of a case shiftable member, means for shifting said member including a crank arm pivotally connected to said member for controlling the case shifting movement thereof, and stop means for said member, said stop means comprising a leaf spring extending along said arm at opposite sides of the pivotal connection thereof with said member, springs acting to normally hold the ends of said leaf spring out of engagement with said arm, and adjustable means carried by said member and acting to engage one or the other of the ends of said leaf spring with said arm when said member reaches one or the other of its case shifting positions.

4. In a typewriting machine, the combination of a case shiftable member mounted for substantially vertical case shifting movement, means for shifting said member including an actuating crank arm pivotally connected to said shiftable member to move the same, and stop means for limiting the case shifting movement of said shiftable member, said stop means comprising resilient means acting between said shiftable member and said actuating arm for resisting relative pivotal movement between said shiftable member and said actuating arm, and means for positively limiting the movement of said resilient means.

5. In a typewriting machine, the combination of a case shiftable member mounted for substantially vertical case shifting movement, means for shifting said member including an actuating crank arm pivotally connected to said shiftable member to move the same, and stop means for limiting the case shifting movement of said shiftable member, said stop means comprising resilient means acting between said shiftable member and said actuating arm for resisting the relative pivotal movement between said shiftable member and said actuating arm, and means for positively limiting the relative pivotal movement between said shiftable member and said actuating arm.

6. In a typewriting machine, the combination of a case shiftable member mounted for substantially vertical case shifting movement, means for shifting said member, and a stop device for limiting the case shifting movement of said shiftable member, said stop device comprising a leaf spring engageable by said shiftable member, an expansion spring biasing said leaf spring toward said shiftable member, and a non-yielding part limiting the movement of said leaf spring against the force of said expansion spring.

7. In a typewriting machine, the combination of relatively movable case shifting parts, means for relatively moving said parts, and a stop device for limiting relative movement between said parts, said stop device comprising an expansion spring carried by one of said relatively movable parts, a leaf spring coacting with said expansion spring and engageable with said one of said relatively movable parts after a predetermined degree of compression of said expansion spring, and means on the other of said relatively movable parts engageable with said leaf spring.

8. In a typewriting machine, the combination of a case shiftable member, a rock shaft, an arm on said rock shaft pivotally connected to said shiftable member, resilient means carried by said arm at opposite sides of said pivotal connection thereof with said shiftable member, and adjustable contacting members carried by said shiftable member to engage said resilient means in respective case shifted positions of said shiftable member.

9. In a typewriting machine, the combination of a case shiftable member, a rock shaft, an arm on said rock shaft pivotally connected to said shiftable member, and resilient means acting between said arm and said shiftable member at opposite sides of said pivotal connection to offer resistance to relative pivotal movement between the arm and the shiftable member and resist movement of the shiftable member to either case shifted position thereof.

WILLIAM J. VICKERY.